(12) United States Patent  
Fenton (10) Patent No.: US 9,170,669 B2  
(45) Date of Patent: Oct. 27, 2015

(54) ELECTRONIC DEVICE AND METHOD OF CONTROLLING SAME

(71) Applicant: RESEARCH IN MOTION LIMITED, Waterloo (CA)

(72) Inventor: Michael Ryan Fenton, Toronto (CA)

(73) Assignee: BLACKBERRY LIMITED, Waterloo (CA)

( * ) Notice: Subject to any disclaimer, the term of this patent is extended or adjusted under 35 U.S.C. 154(b) by 174 days.

(21) Appl. No.: 13/897,110

(22) Filed: May 17, 2013

(65) Prior Publication Data

US 2014/0340319 A1    Nov. 20, 2014

(51) Int. Cl.  
G06F 3/041    (2006.01)  
G06F 3/0484    (2013.01)

(52) U.S. Cl.  
CPC .............. G06F 3/041 (2013.01); G06F 3/0484 (2013.01)

(58) Field of Classification Search  
None  
See application file for complete search history.

(56) References Cited

U.S. PATENT DOCUMENTS

| 8,656,296 | B1 * | 2/2014 | Ouyang et al. ................ 715/770 |
| 2011/0239110 | A1 | 9/2011 | Garrett et al. |
| 2011/0310026 | A1 | 12/2011 | Davis et al. |
| 2011/0320978 | A1 | 12/2011 | Horodezky et al. |
| 2012/0030566 | A1 | 2/2012 | Victor |
| 2012/0192065 | A1 | 7/2012 | Migos et al. |
| 2012/0268387 | A1 * | 10/2012 | Kuo et al. ..................... 345/173 |
| 2013/0047115 | A1 | 2/2013 | Migos et al. |

OTHER PUBLICATIONS

"Conveniently select text, images, annotations, etc. in a PDF or any other text format on a touch based mobile/tablet device", IP. Com Journal, IP. Com Inc., West Henrietta, NY, US, Mar. 1, 2011, XP013142665, ISSN: 1533-0001.
Extended European Search Report dated Aug. 23, 2013, issued from the corresponding European patent application No. 13168220.5.

* cited by examiner

Primary Examiner — Jason Olson  
(74) Attorney, Agent, or Firm — Geoffrey deKleine; Borden Ladner Gervais LLP (57) ABSTRACT

A method includes displaying information on a touch-sensitive display and displaying an indicator at a first location in the information, detecting, on the touch-sensitive display, a first touch input associated with the indicator, in response to detecting the first touch input, moving the indicator from the first location to a second location in the information, wherein the second location is based on an increment level of the indicator, detecting, on the touch-sensitive display, a second touch input associated with the indicator, increasing the increment level of the indicator, and moving the indicator from the second location to a third location, wherein the third location is based on the increased increment level.

16 Claims, 9 Drawing Sheets

ELECTRONIC DEVICE AND METHOD OF CONTROLLING SAME

FIELD OF TECHNOLOGY

The present disclosure relates to electronic devices including, but not limited to, portable electronic devices and their control.

BACKGROUND

Electronic devices, including portable electronic devices, have gained widespread use and may provide a variety of functions including, for example, telephonic, electronic messaging and other personal information manager (PIM) application functions. Portable electronic devices include several types of devices including mobile stations such as simple cellular telephones, smart telephones (smart phones), Personal Digital Assistants (PDAs), tablet computers, and laptop computers, with wireless network communications or near-field communications connectivity such as Bluetooth® capabilities.

Portable electronic devices such as PDAs, or tablet computers are generally intended for handheld use and ease of portability. A touch-sensitive input device, such as a touch-screen display, is particularly useful on handheld devices, which are small and may have limited space for user input and output. Improvements in electronic devices with displays are desirable.

BRIEF DESCRIPTION OF THE DRAWINGS

Embodiments of the present disclosure will now be described, by way of example only, with reference to the attached Figures, wherein:

FIG. 4 through FIG. 14 are front views of examples of a portable electronic device in accordance with the disclosure.

DETAILED DESCRIPTION

The following describes an electronic device and a method that includes displaying information on a touch-sensitive display and displaying an indicator at a first location in the information, detecting, on the touch-sensitive display, a first touch input associated with the indicator, in response to detecting the first touch input, moving the indicator from the first location to a second location in the information, wherein the second location is based on an increment level of the indicator, detecting, on the touch-sensitive display, a second touch input associated with the indicator, increasing the increment level of the indicator, and moving the indicator from the second location to a third location, wherein the third location is based on the increased increment level.

For simplicity and clarity of illustration, reference numerals may be repeated among the figures to indicate corresponding or analogous elements. Numerous details are set forth to provide an understanding of the embodiments described herein. The embodiments may be practiced without these details. In other instances, well-known methods, procedures, and components have not been described in detail to avoid obscuring the embodiments described. The description is not to be considered as limited to the scope of the embodiments described herein.

The disclosure generally relates to an electronic device, such as a portable electronic device or non-portable electronic device. Examples of portable electronic devices include mobile, or handheld, wireless communication devices such as pagers, cellular phones, cellular smart-phones, wireless organizers, personal digital assistants, wirelessly enabled notebook computers, tablet computers, mobile internet devices, electronic navigation devices, and so forth. The portable electronic device may be a portable electronic device without Wi-Fi communication capabilities, such as handheld electronic games, digital photograph albums, digital cameras, media players, e-book readers, and so forth. Examples of non portable electronic devices include desktop computers, electronic white boards, smart boards utilized for collaboration, built-in monitors or displays in furniture or appliances, and so forth.

Figure 1:
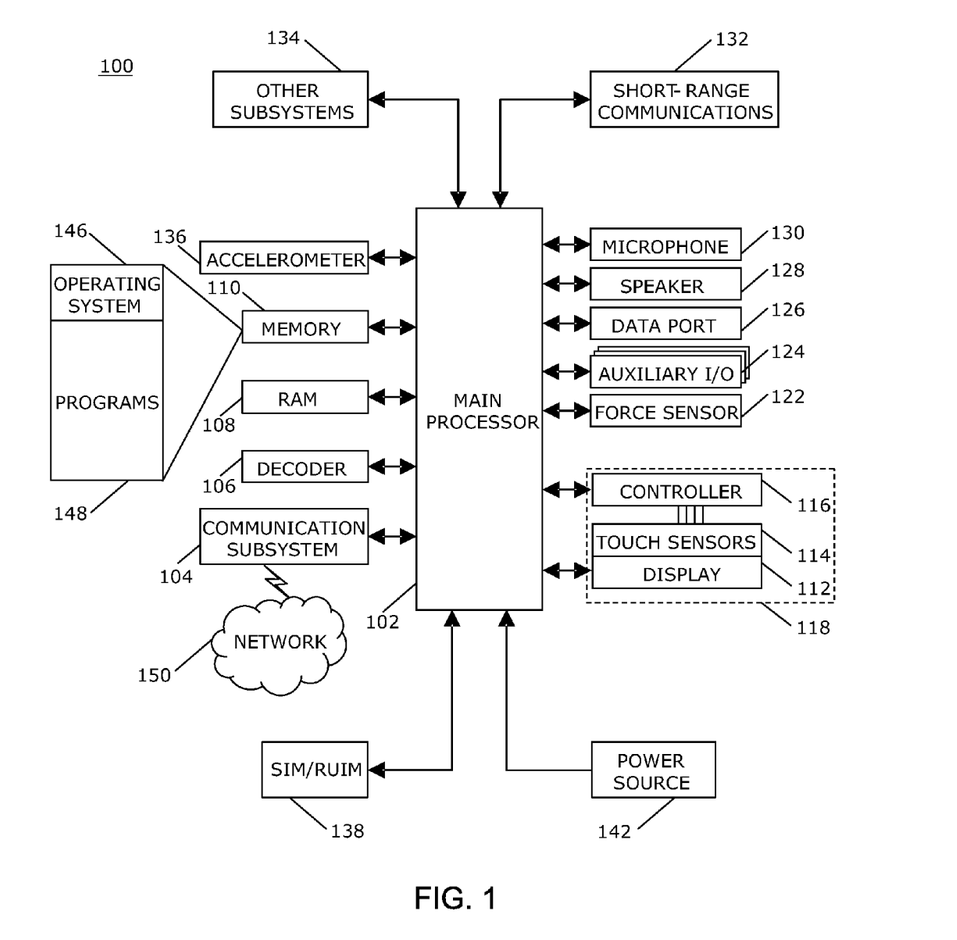
FIG. 1 is a block diagram of an example of a portable electronic device in accordance with the disclosure.

A block diagram of an example of an electronic device 100 is shown in FIG. 1. The electronic device 100 includes multiple components, such as a processor 102 that controls the overall operation of the electronic device 100. Communication functions, including data and voice communications, are performed through a communication subsystem 104. Data received by the electronic device 100 is decompressed and decrypted by a decoder 106. The communication subsystem 104 receives messages from and sends messages to a wireless network 150. The wireless network 150 may be any type of wireless network, including, but not limited to, data wireless networks, voice wireless networks, and networks that support both voice and data communications. A power source 142, such as one or more rechargeable batteries or a port to an external power supply, powers the electronic device 100.

The processor 102 interacts with other components, such as a Random Access Memory (RAM) 108, memory 110, a touch-sensitive display 118, one or more force sensors 122, an auxiliary input/output (I/O) subsystem 124, a data port 126, a speaker 128, a microphone 130, short-range communications 132 and other device subsystems 134. The touch-sensitive display 118 includes a display 112 and touch sensors 114 that are coupled to at least one controller 116 that is utilized to interact with the processor 102. Input via a graphical user interface is provided via the touch-sensitive display 118. Information, such as text, characters, symbols, images, icons, and other items that may be displayed or rendered on a portable electronic device, is displayed on the touch-sensitive display 118 via the processor 102. The processor 102 may also interact with an accelerometer 136 that may be utilized to detect direction of gravitational forces or gravity-induced reaction forces.

To identify a subscriber for network access, the electronic device 100 may utilize a Subscriber Identity Module or a Removable User Identity Module (SIM/RUIM) card 138 for communication with a network, such as the wireless network 150. Alternatively, user identification information may be programmed into memory 110.

The electronic device 100 includes an operating system 146 and software programs, applications, or components 148 that are executed by the processor 102 and are typically stored in a persistent, updatable store such as the memory 110. Additional applications or programs may be loaded onto the electronic device 100 through the wireless network 150, the auxiliary I/O subsystem 124, the data port 126, the short-range communications subsystem 132, or any other suitable subsystem 134.

A received signal such as a text message, an e-mail message, or web page download is processed by the communication subsystem 104 and input to the processor 102. The processor 102 processes the received signal for output to the display 112 and/or to the auxiliary I/O subsystem 124. A subscriber may generate data items, for example e-mail messages, which may be transmitted over the wireless network 150 through the communication subsystem 104. For voice communications, the overall operation of the electronic device 100 is similar. The speaker 128 outputs audible information converted from electrical signals, and the microphone 130 converts audible information into electrical signals for processing.

The touch-sensitive display 118 may be any suitable touch-sensitive display, such as a capacitive touch-sensitive display. A capacitive touch-sensitive display includes capacitive touch sensors 114. The capacitive touch sensors may comprise any suitable material, such as indium tin oxide (ITO).

One or more touches, also known as touch contacts or touch events, may be detected by the touch-sensitive display 118. The processor 102 may determine attributes of the touch, including a location of the touch. Touch location data may include data for an area of contact or data for a single point of contact, such as a point at or near a center of the area of contact. The location of a detected touch may include x and y components, e.g., horizontal and vertical components, respectively, with respect to one's view of the touch-sensitive display 118. A touch may be detected from any suitable input member, such as a finger, thumb, appendage, or other objects, for example, a stylus, pen, or other pointer, depending on the nature of the touch-sensitive display 118. Multiple simultaneous touches may be detected. A tap, which is a particular type of touch on a touch-sensitive display 118 may be a touch that ends within a threshold period of time. Thus, the touch contact with the touch-sensitive display 118 is relatively short because contact ends within a threshold period of time of beginning.

One or more gestures may also be detected by the touch-sensitive display 118. A gesture, such as a swipe, also known as a flick, is a particular type of touch on a touch-sensitive display 118 and may begin at an origin point and continue to an end point, for example, a concluding end of the gesture. A gesture may be identified by attributes of the gesture, including the origin point, the end point, the distance travelled, the duration, the velocity, and the direction, for example. A gesture may be long or short in distance and/or duration. Two points of the gesture may be utilized to determine a direction of the gesture. A gesture may also include a hover. A hover may be a touch at a location that is generally unchanged over a period of time or is associated with the same selection item for a period of time.

Optional force sensors 122 may be disposed in conjunction with the touch-sensitive display 118 to determine or react to forces applied to the touch-sensitive display 118. The force sensors 122 may be disposed in line with a piezo actuator 120. The force sensors 122 may be force-sensitive resistors, strain gauges, piezoelectric or piezoresistive devices, pressure sensors, quantum tunneling composites, force-sensitive switches, or other suitable devices. Force as utilized throughout the specification refers to force measurements, estimates, and/or calculations, such as pressure, deformation, stress, strain, force density, force-area relationships, thrust, torque, and other effects that include force or related quantities. Optionally, force information related to a detected touch may be utilized to select information, such as information associated with a location of a touch. For example, a touch that does not meet a force threshold may highlight a selection option, whereas a touch that meets a force threshold may select or input that selection option. Selection options include, for example, displayed or virtual keys of a keyboard; selection boxes or windows, e.g., "cancel," "delete," or "unlock"; function buttons, such as play or stop on a music player; and so forth. Different magnitudes of force may be associated with different functions or input. For example, a lesser force may result in panning, and a higher force may result in zooming.

The touch-sensitive display 118 includes a display area in which information may be displayed, and a non-display area extending around the periphery of the display area. The display area generally corresponds to the area of the display 112. Information is not displayed in the non-display area by the display, which non-display area is utilized to accommodate, for example, electronic traces or electrical connections, adhesives or other sealants, and/or protective coatings around the edges of the display area. The non-display area may be referred to as an inactive area and is not part of the physical housing or frame of the electronic device. Typically, no pixels of the display are in the non-display area, thus no image can be displayed by the display 112 in the non-display area. Optionally, a secondary display, not part of the primary display 112, may be disposed under the non-display area. Touch sensors may be disposed in the non-display area, which touch sensors may be extended from the touch sensors in the display area or distinct or separate touch sensors from the touch sensors in the display area. A touch, including a gesture, may be associated with the display area, the non-display area, or both areas. The touch sensors may extend across substantially the entire non-display area or may be disposed in only part of the non-display area.

Figure 2:
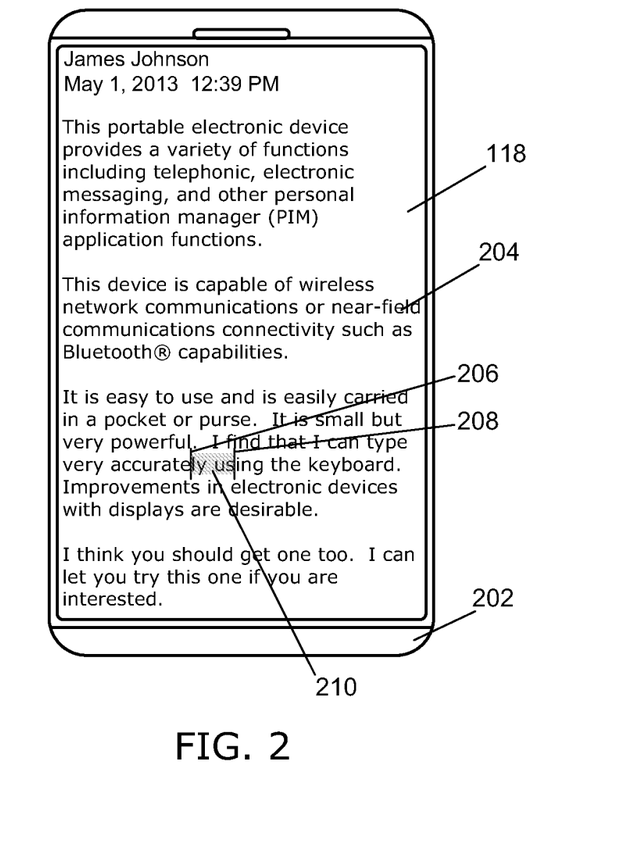
FIG. 2 is a front view of an example of a portable electronic device in accordance with the disclosure.

A front view of an example of the electronic device 100 is shown in FIG. 2. The electronic device 100 includes a housing 202 in which the touch-sensitive display 118 is disposed. The housing 202 is utilized to enclose components such as the components shown in FIG. 1.

Information may be displayed on the touch-sensitive display 118. In the example illustrated in FIG. 2, the information displayed is text 204 that includes words or strings in sentences that are arranged in paragraphs. Part of the information may not be displayed. For example, the information may too long, or may be displayed at a font or character size that is too large to be displayed at one time on the touch-sensitive display 118. Additional information may be displayable, for example, by scrolling upwardly or downwardly to change the part of the information that is displayed.

The information is selectable, for example, when two touches that overlap at least partially in time, are detected on the touch-sensitive display 118. In the example of two touches that are detected on the touch-sensitive display 118 at one time, the associated locations within the text 204 are determined. The text 204 that is located between the associated locations in the text 204, is selected. To show that the text 204 is selected, the selected text is highlighted on the touch-sensitive display 118 and a first indicator 206 is displayed at the start of the selected text and a second indicator 208 is displayed at the end of the selected text.

Figure 3:
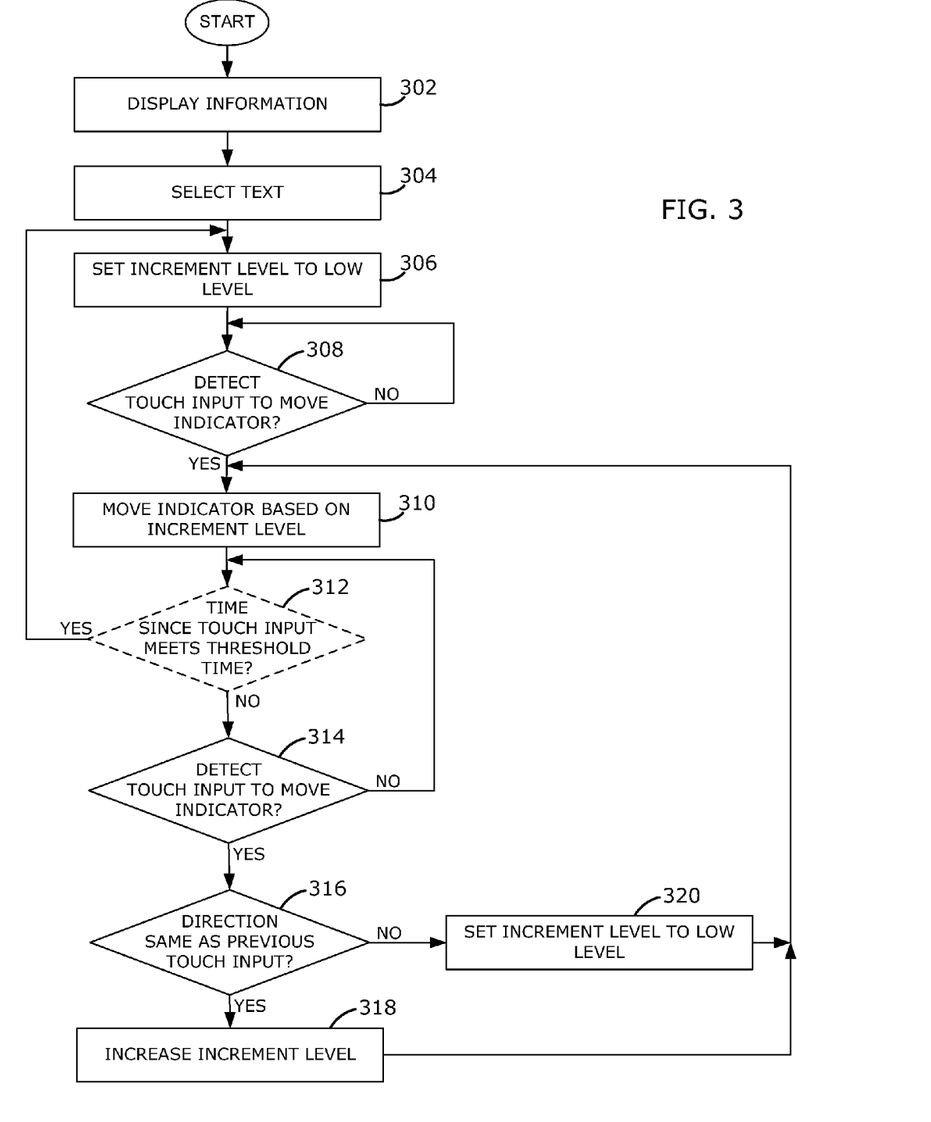
FIG. 3 is a flowchart illustrating a method of controlling indicator movement in accordance with the disclosure.

A flowchart illustrating a method of controlling indicator movement is shown in FIG. 3. The method may be carried out by software executed, for example, by the processor 102. Coding of software for carrying out such a method is within the scope of a person of ordinary skill in the art given the present description. The method may contain additional or fewer processes than shown and/or described, and may be performed in a different order. Computer-readable code executable by at least one processor of the portable electronic device to perform the method may be stored in a computer-readable medium, such as a non-transitory computer-readable device.

The process may be carried out in any suitable program or application in which information including characters, such as alphabetical, numerical, and symbolic characters, are displayed. Examples of suitable applications include email, text messaging, calendar, tasks, address book, map, Web browser, word processing, and so forth. Information from the application is displayed on the display 112 of the portable electronic device 100. The information is displayed 302. As described above with reference to FIG. 2, the information includes words or strings of sentences arranged in paragraphs.

Part of the information is selected at 304. As described above, the part of the information may be selected, for example, when two touches are detected on the touch-sensitive display 118 at one time. The associated locations within the information are determined. The information that is located between the associated locations, is selected. The selected information is highlighted on the touch-sensitive display 118 and indicators, such as the first indicator 206 and the second indicator 208 are displayed at the beginning and at the end of the selected information.

One of the indicators may be moved to a new location by a touch input such as a gesture, which may be a flick. The indicator may be moved quickly, also referred to as snapped, to the new location. The new location to which the indicator is moved is dependent on an increment level of the indicator and an associated direction, which may be a direction of the gesture when the touch input is a gesture or may be dependent on the indicator with which the tap is associated when the touch input is a tap. For example, multiple increment levels may be utilized such that an indicator may move to a beginning or end of a string, to a beginning or end of a line, to a beginning or end of a paragraph or to a beginning of a preceding paragraph or end of a following paragraph, depending on the increment level. The increment level is set to a lowest level at 306. The lowest level is the lowest level of movement. In the example of a gesture from right to left or a tap on a first or beginning indicator, a lowest level may be movement to a beginning of a string. Subsequent levels may include, for example, movement to a beginning of a line, movement to a beginning of a paragraph, and movement to a beginning of a preceding paragraph. In the example of a gesture from left to right or a tap on a second or end indicator, a lowest level may be movement to an end of a string. Subsequent levels may include, for example, movement to an end of a line, movement to an end of a paragraph, and movement an end of a following paragraph. Other levels may be utilized.

When a touch input to move an indicator is detected at 308, an associated direction of the touch input is determined and the method continues at 310. The associated direction may be dependent on, for example, a direction of a gesture or the one of the indicators with which a tap is associated. A touch input to move an indicator may be any suitable touch, such as a gesture that begins on or near the selected information or on or near an indicator and moves generally from right to left, a gesture that begins on or near the selected information or on or near an indicator and moves generally from left to right, a tap associated with an indicator, or any other suitable touch.

In response to detecting the touch input to move the indicator, one of the indicators is moved to a new location at 310. The new location to which the indicator is moved is dependent on the increment level. When the touch input is a beginning or next touch input after selection of text begins, the increment level may be the lowest level, for example, the beginning or the end of a string. The indicator that is moved and the direction that the indicator is moved is dependent on the direction of the gesture, when the touch is a gesture, or dependent on which of the indicators a tap is associated with. For example, a gesture that moves generally right to left may move the indicator at the beginning of the selected information. A gesture that moves generally left to right may move the indicator at the end of the selected information. A tap on the first indicator or indicator at the beginning of the selected information may move the first indicator. A tap of the second indicator or the indicator at the end of the selected information may move the indicator at the end of the selected information.

The time that passes after the touch input is detected at 308 and before another touch input is detected may optionally be determined at 312. The determination of time and return to 306 when the time meets the threshold is optional and the method may be carried out without determining the time at 312. When the time after the touch input is detected at 308 meets a threshold time, the method continues at 306 and the increment level is again set to the lowest level, or starting level. When the time does not meet a threshold, the method continues at 314. The time may meet the threshold time when the time is equal to or exceeds the threshold time.

When a touch input to move an indicator is detected at 314, an associated direction is determined and the method continues at 316. The touch input to move an indicator may be any suitable touch input as described with reference to 308.

When the associated direction of the touch input detected at 314 is the same as the associated direction of the touch input detected at 308, the method continues at 318. Thus, at 316, a determination is made whether or not the touch input detected at 314 is a touch input to move the same indicator in the same direction as the indicator moved at 310. When the touch input is a touch input to move the same indicator in the same direction, the increment level is increased by one to the next increment level at 318 and the method continues at 310 where the one of the indicators is moved to a new location that is dependent on the new increment level.

When the touch input is a touch input to move the other indicator, which was not the previously moved indicator, the method proceeds from 316 to 320 where the increment level is set to the lowest increment level. The method proceeds to 310 where the other indicator is moved to a new location that is dependent on the lowest increment level.

Although not shown, the method may be discontinued at any time, for example, when other input, such as a tap is detected at a location on the touch-sensitive display 118.

Examples of indicator movement on a display of a portable electronic device are illustrated in FIG. 4 through FIG. 10. The examples illustrated in FIG. 4 through FIG. 10 continue from the example illustrated in FIG. 2 in which information is text 204 in a body of, for example, an email. A portion of the text 204 is selected at 304 and a first indicator 206 is displayed at a beginning of the selected text 210 and a second indicator 208 is displayed at an end of the selected text 210.

Figures 4, 5:
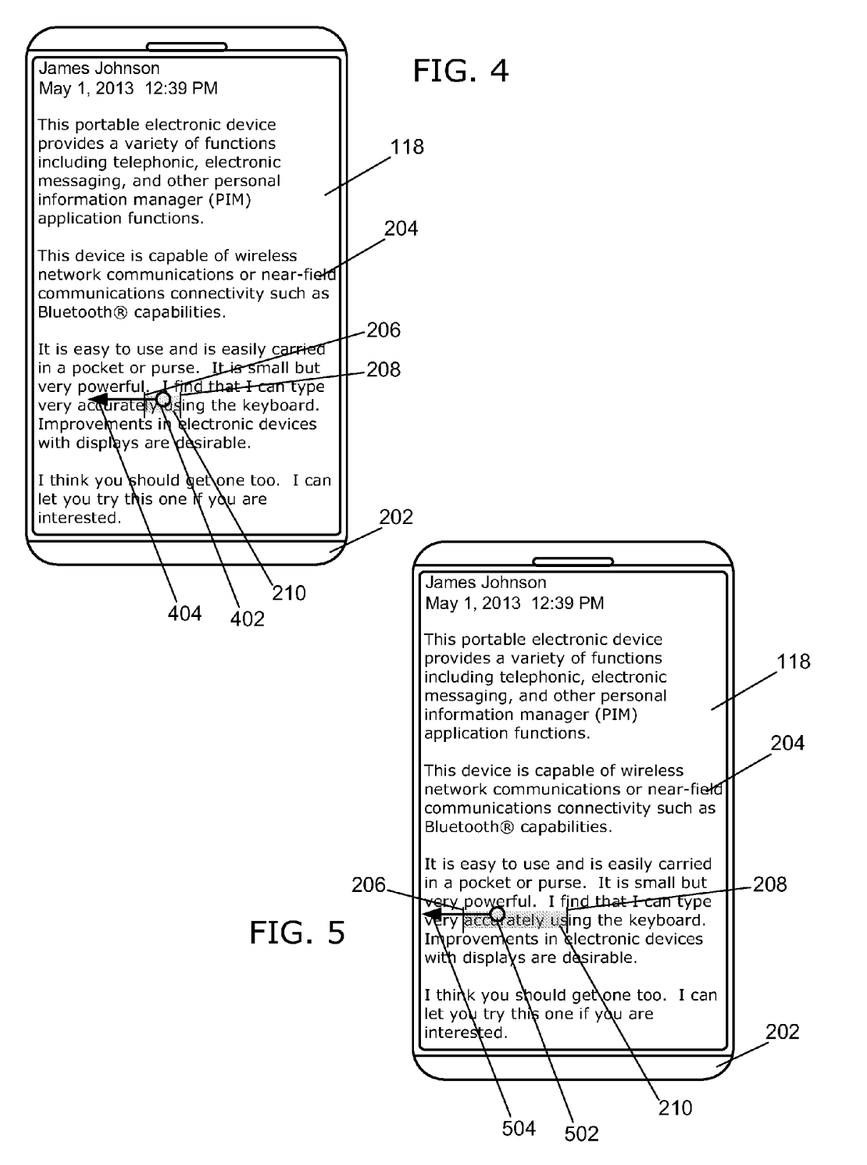

The increment level is at the lowest level at 306 because no previous touch input was detected.

A flick is detected at a location associated with the text at 308. The circle 402 illustrates the origin of the flick. The arrow 404 illustrates the path of the flick on the touch-sensitive display 118. In this example, the origin of the flick is near the selected text 210 and therefore the flick is a touch input to move an indicator. The path is generally from right to left and thus, the flick is a gesture to move the first indicator 206 to a preceding location in the text 204.

The first indicator 206 is moved to the beginning of the string as illustrated in FIG. 5 and the amount or part of the text 204 that is selected is increased.

For the purpose of the present example, another flick is detected at 316 within the threshold period of time, i.e., before the time meets the time threshold. The circle 502 illustrates the origin of the flick. The arrow 504 illustrates the path of the flick on the touch-sensitive display 118. The flick is a touch input to move an indicator. The path is generally from right to left and the associated direction is the same as the associated direction of the previously detected flick. Thus, the flick is a gesture to move the first indicator 206 to a preceding location in the text 204.

Figures 6, 7:
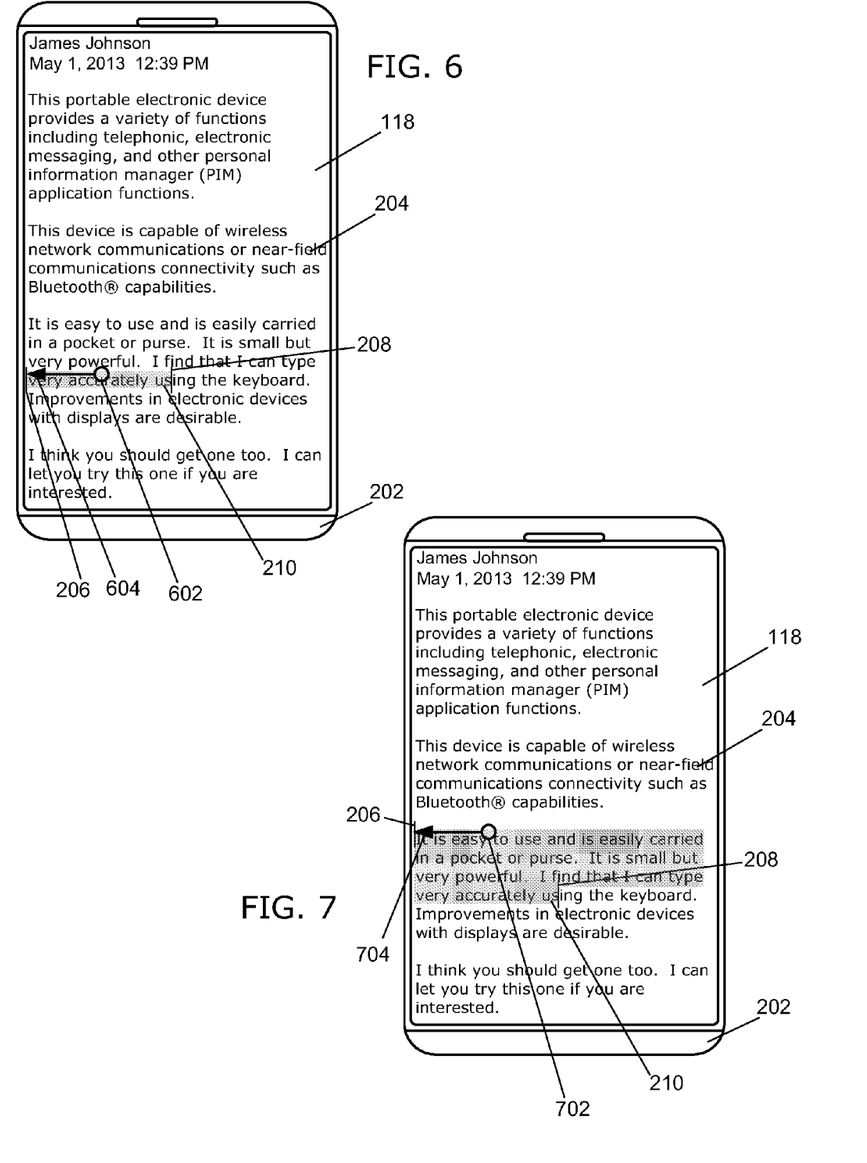

The increment level is increased to the next level at 318 and the first indicator 206 is moved to the beginning of the line as illustrated in FIG. 6. The amount or part of the text 204 that is selected is increased to include the text to the beginning of the line.

For the purpose of the present example, another flick is detected at 316 within the threshold period of time. The circle 602 illustrates the origin of the flick. The arrow 604 illustrates the path of the flick on the touch-sensitive display 118. The flick is a touch input to move an indicator. The path is generally from right to left and the associated direction is the same as the associated direction of the previously detected flick. Thus, the flick is a gesture to move the first indicator 206 to a preceding location in the text 204.

The increment level is increased to the next level at 318 and the first indicator 206 is moved to the beginning of the paragraph as illustrated in FIG. 7. The amount or part of the text 204 that is selected is increased to include the text to the beginning of the paragraph.

For the purpose of the present example, another flick is detected at 316 within the threshold period of time. The circle 702 illustrates the origin of the flick. The arrow 704 illustrates the path of the flick on the touch-sensitive display 118. The flick is a touch input to move an indicator. The path is generally from right to left and the associated direction is the same as the associated direction of the previously detected flick. Thus, the flick is a gesture to move the first indicator 206 to a preceding location in the text 204.

Figures 8, 9:
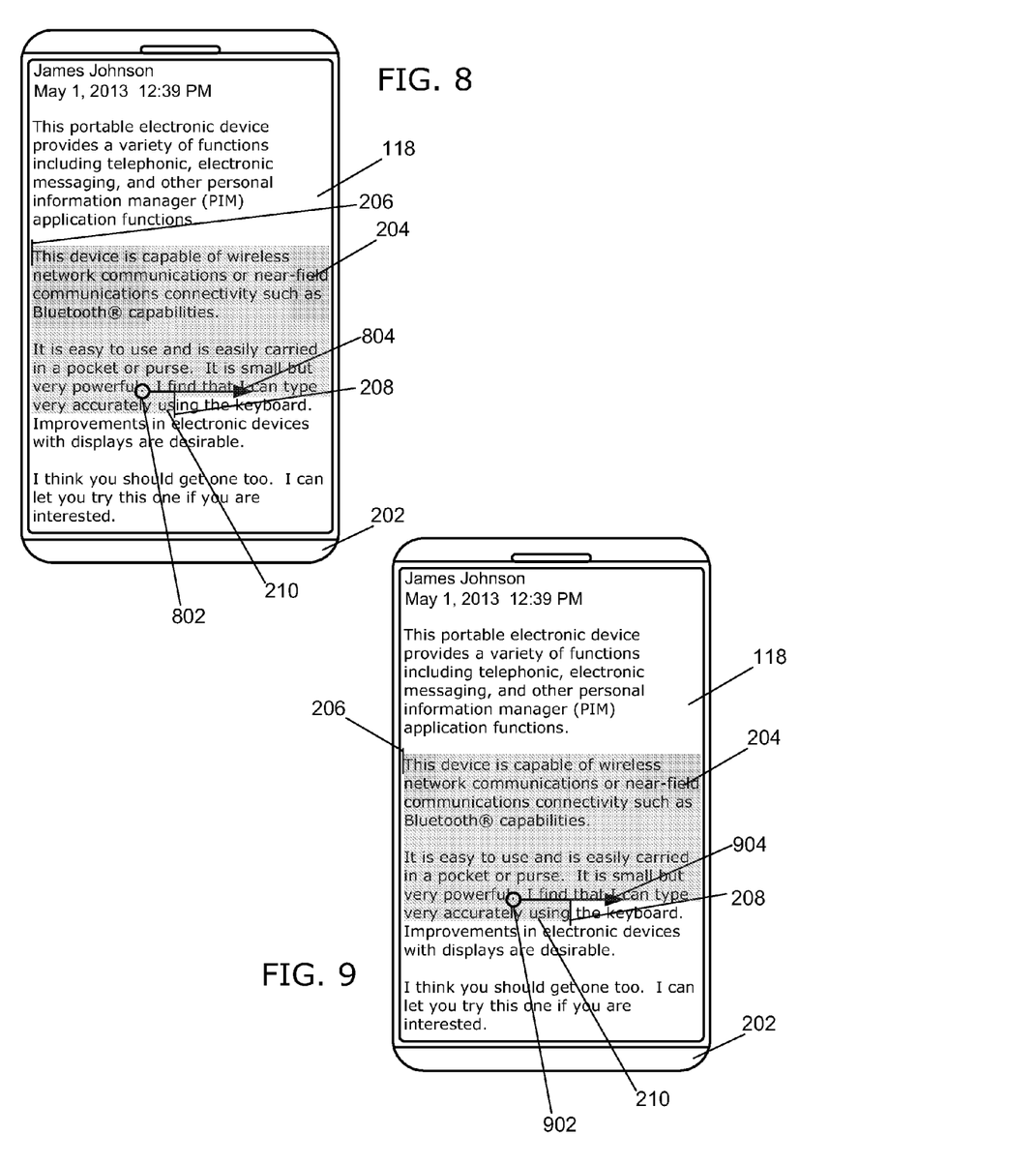

The increment level is increased to the next level at 318 and the first indicator 206 is moved to the beginning of the preceding paragraph as illustrated in FIG. 8. The amount or part of the text 204 that is selected is increased to include the entire preceding paragraph.

For the purpose of the present example, another flick is detected at 316 within the threshold period of time. The circle 802 illustrates the origin of the flick. The arrow 804 illustrates the path of the flick on the touch-sensitive display 118. The flick is a touch input to move an indicator. The path is generally from left to right and the associated direction is not the same as the associated direction of the previously detected flick. The associated direction in this example is opposite that of the previously detected flick. Thus, the flick is a gesture to move the second indicator 208 to a subsequent location in the text 204.

The increment level is set to the lowest level at 320 and the second indicator 208 is moved to the end of the string as illustrated in FIG. 9. The amount or part of the text 204 that is selected is increased to include the entire string.

For the purpose of the present example, another flick is detected at 316 within the threshold period of time. The circle 902 illustrates the origin of the flick. The arrow 904 illustrates the path of the flick on the touch-sensitive display 118. The flick is a touch input to move an indicator. The path is generally from left to right and the associated direction is the same as the associated direction of the previously detected flick. Thus, the flick is a gesture to move the second indicator 208 to a subsequent location in the text 204.

Figure 10:
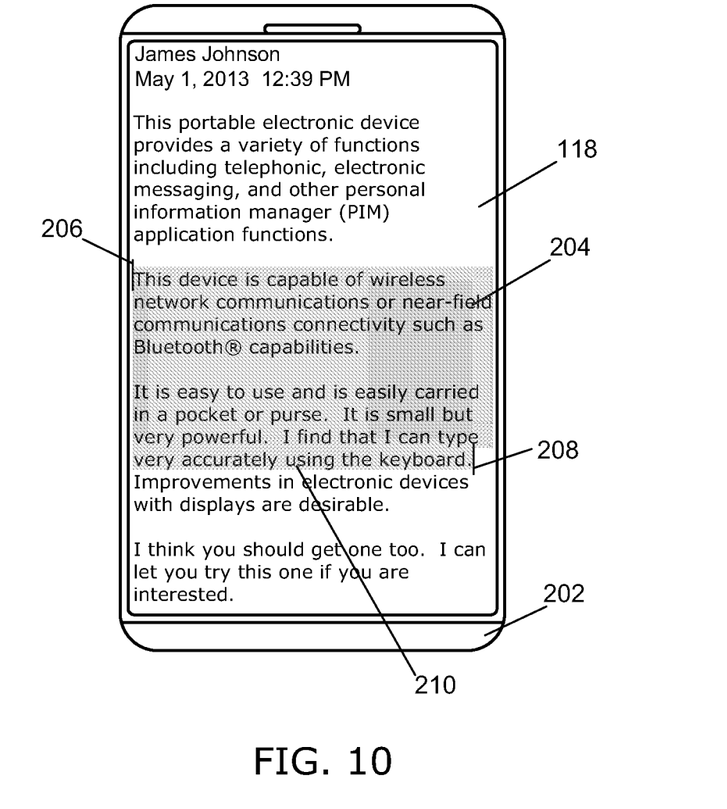

The increment level is increased and the second indicator 208 is moved to the end of the line as illustrated in FIG. 10. The amount or part of the text 204 that is selected is increased to include the entire line.

In the above examples, another gesture is detected within the threshold period of time, i.e., before the time meets the threshold at 312. When the time meets the threshold, the increment level is returned to the lowest level.

Another example of indicator movement on a display of a portable electronic device is illustrated in FIG. 11 through FIG. 14. The examples illustrated in FIG. 11 through FIG. 14 show text 1102 in a body of, for example, an email. A portion of the text 1102 is selected at 304 and a first indicator 1106 is displayed at a beginning of the selected text 1110 and a second indicator 1108 is displayed at an end of the selected text 1110. For the purpose of this example, the indicators 1106, 1108 each include a line with a circle at one end, similar to a lollipop shape. The first indicator 1106 includes the circle at the top of the line, generally above the selected text 1110 and the second indicator 1108 includes a line with a circle at the bottom of the line, generally below the selected text 1110. The terms above and below are generally utilized to refer to the orientation in which the information is displayed and are not otherwise limiting.

Figures 11, 12:
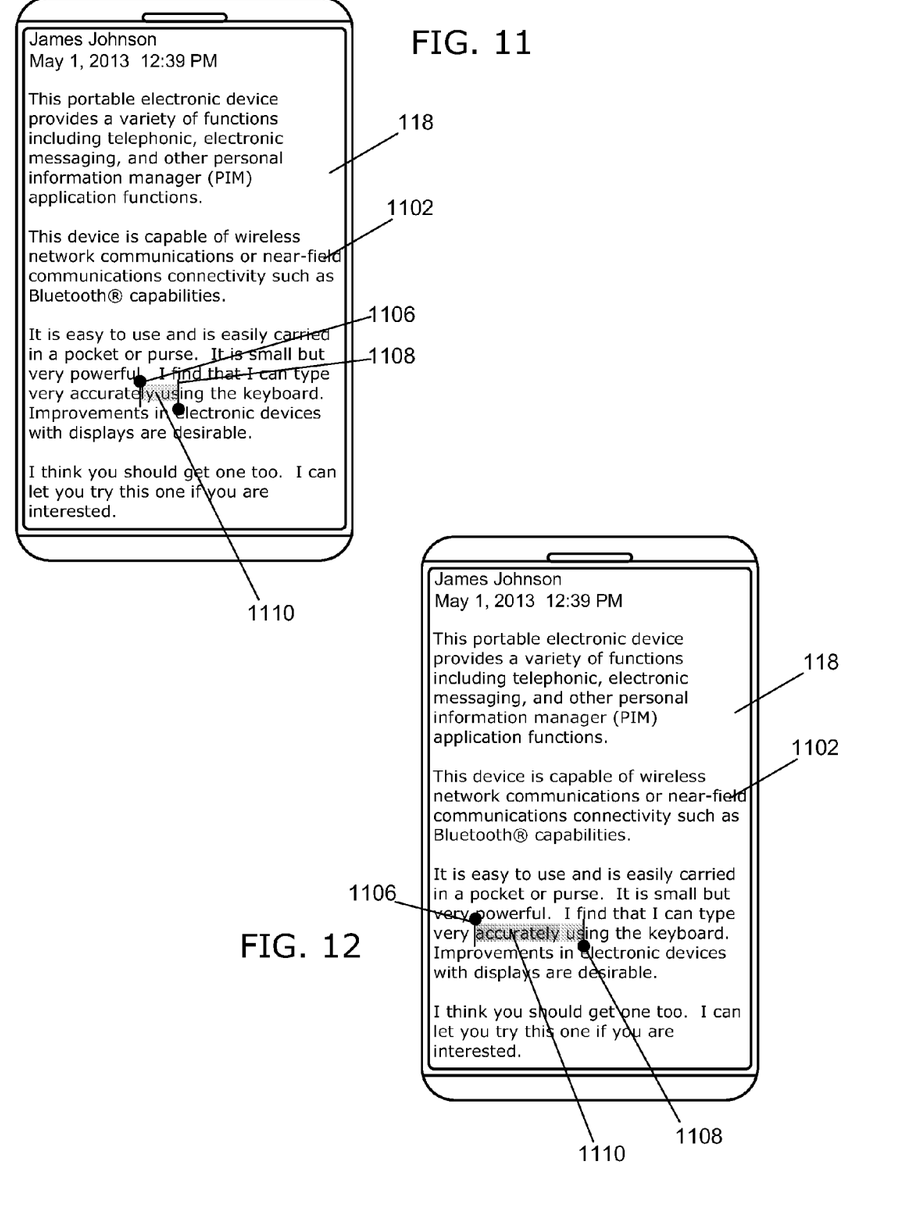

The increment level is at the lowest level at 306 because no previous touch input was detected.

A tap is detected at a location associated with the first indicator 1106 at 308. The tap is generally at or near the circle of the first indicator 1106 and therefore the tap is a touch input to move the first indicator 1106 to a preceding location in the text 1102.

The first indicator 1106 is moved to the beginning of the string as illustrated in FIG. 12 and the amount or part of the text 1102 that is selected is increased.

For the purpose of the present example, another tap is detected at 316 within the threshold period of time, i.e., before the time meets the time threshold. The tap is generally at or near the new location of the circle of the first indicator 1106. The tap is a touch input to move the first indicator 1106 and therefore the associated direction is the same as the associated direction of the previously detected tap. Thus, the tap is a touch input to move the first indicator 1106 to a preceding location in the text 1102.

Figure 13:
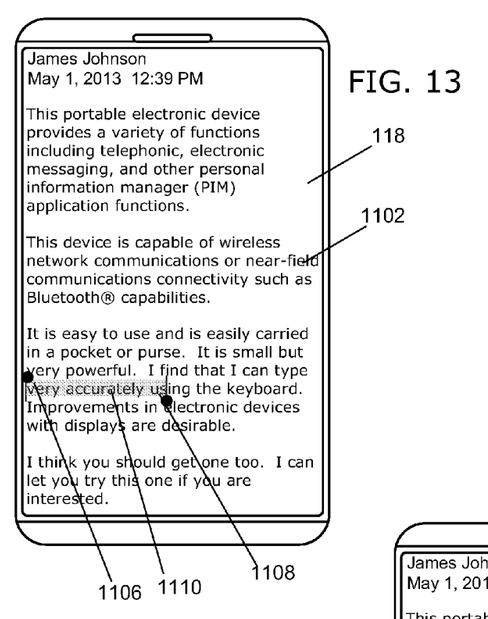

The increment level is increased to the next level at 318 and the first indicator 1106 is moved to the beginning of the line as illustrated in FIG. 13. The amount or part of the text 1102 that is selected is increased to include the text to the beginning of the line.

For the purpose of the present example, another tap is detected at 316 within the threshold period of time. The tap is at or near the new location of the circle of the first indicator 1106 and the tap is a touch input to move an indicator. The associated direction is determined based on which of the first indicator 1106 and the second indicator 1108 the tap is associated with. Because the tap is again associated with the first indicator 1106, the associated direction is the same as that of the previously detected tap. Thus, the tap is a touch input to move the first indicator 1106 to a preceding location in the text 1102.

Figure 14:
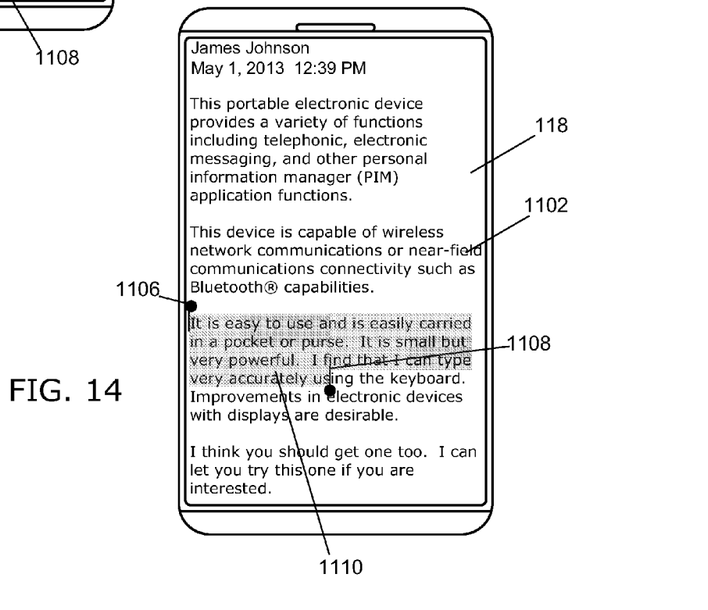

The increment level is increased to the next level at 318 and the first indicator 1106 is moved to the beginning of the paragraph as illustrated in FIG. 14. The amount or part of the text 1102 that is selected is increased to include the text to the beginning of the paragraph.

In the above examples, indicators are moved to expand the selected area. The indicator may also be moved to reduce the selected area. For example, a gesture that begins at an origin outside the selected text and moves toward the selected text may move the indicator to reduce the amount of text selected. A gesture that begins inside the selected text may increase the amount of text selected. In both cases, the movement is based on the increment level. Alternatively, the indicator moved may be dependent on the location of the origin of the gesture such that the indicator that is moved is the indicator that is closer to the origin of the gesture. Thus, the first indicator may be moved, for example from left to right to decrease the amount of text selected. The location to which the first indicator moves is dependent on an increment level. Similarly, the second indicator may be moved from right to left to decrease the amount of text selected.

Similarly, a tap on or near the second indicator 1108 moves the second indicator 1108 to a new location to increase the amount of text selected.

Utilizing the method of the present disclosure, the amount of text selected may be controlled by touch input on the touch-sensitive display 118. The touch input controls movement of an indicator at the beginning or end of the selected text to a new location. The indicator may be, for example, a cursor or other displayed feature or may be the beginning or the end of the highlighted text. The new location of the indicator is dependent on an increment level of the indicator when the touch input is detected. The increment level is changed based on an associated direction and timing of previous touch inputs to move the indicator. Thus, the location to which the indicator is moved, may be adjusted based on previously detected touch input. Text may be quickly and easily selected. For example, additional text may be selected to include all text to a beginning of a line, or paragraph, by multiple gestures generally in the same direction.

According to one example, a method includes displaying information on a touch-sensitive display and displaying an indicator at a first location in the information, detecting, on the touch-sensitive display, a first touch input associated with the indicator, in response to detecting the first touch input, moving the indicator from the first location to a second location in the information, wherein the second location is based on an increment level of the indicator, detecting, on the touch-sensitive display, a second touch input associated with the indicator, increasing the increment level of the indicator, and moving the indicator from the second location to a third location, wherein the third location is based on the increased increment level.

According to another example, an electronic device includes a touch-sensitive display that displays information and an indicator at a first location in the information, and a processor. The processor is coupled to the touch-sensitive display to detect, on the touch-sensitive display, a first touch input associated with the indicator, in response to detecting the first touch input, move the indicator from the first location to a second location in the information, wherein the second location is based on an increment level of the indicator, detect, on the touch-sensitive display, a second touch input associated with the indicator, increase the increment level of the indicator, and move the indicator from the second location to a third location, wherein the third location is based on the increased increment level.

The scope of the claims should not be limited by the preferred embodiments set forth in the examples, but should be given the broadest interpretation consistent with the description as a whole.

What is claimed is:

1. A method comprising:
    displaying information on a touch-sensitive display and displaying a first indicator in the information, displaying a second indicator in the information, and selecting a portion of the information between the first indicator and the second indicator;
    after selecting the portion of the information between the first indicator and the second indicator, detecting, on the touch-sensitive display, a first touch input comprising a first gesture having a first origin and continuing in a first direction to a first end point, wherein the first gesture is associated with one of the first indicator and the second indicator;
    in response to detecting the first gesture:
        moving the associated one of the first indicator and the second indicator from a first location to a second location in the information, wherein the second location is identified based on an increment level of the indicator; and
        increasing or decreasing the selected portion of the information to select the information from the first indicator to the second indicator;
    after the first touch input ends, detecting, on the touch-sensitive display, a second touch input comprising a second gesture having a second origin and a second direction to a second end point, wherein the second gesture is associated with the one of the first indicator and the second indicator;
    in response to detecting the second gesture after the first gesture and determining that the second gesture is generally in a same direction as the first gesture:
        increasing the increment level of the associated one of the first indicator and the second indicator; and
        moving the associated one of the first indicator and the second indicator from the second location to a third location, wherein the third location is identified based on the increased increment level of the associated one of the first indicator and the second indicator.

2. The method according to claim 1, wherein the increment level of the associated one of the first indicator and the second indicator is increased in response to detecting the second touch input within a threshold period of time of detecting the first touch input.

3. The method according to claim 1, wherein the associated one of the first indicator and the second indicator comprises an identifier of one of a start and an end of the selected portion of the information.

4. The method according to claim 3, wherein moving the associated one of the first indicator and the second indicator comprises selecting a further portion of the information.

5. The method according to claim 3, wherein moving the associated one of the first indicator and the second indicator comprises deselecting at least some of the portion of information.

6. The method according to claim 1, wherein when the associated one of the first indicator and the second indicator comprises an identifier of a start of the selected portion of text, the second location comprises one of a beginning of a string, a beginning of a line of the text, and a beginning of a paragraph of the text.

7. The method according to claim 6, wherein the third location comprises one of the beginning of the line of text, the beginning of the paragraph of the text, and a beginning of a preceding paragraph of the text.

8. The method according to claim 1, wherein when the associated one of the first indicator and the second indicator comprises an identifier of an end of the selected portion of text, the second location comprises one of an end of a string, an end of a line of the text, and an end of a paragraph of the text.

9. The method according to claim 8, wherein the third location comprises one of the end of the line, the end of the paragraph, and an end of a following paragraph.

10. The method according to claim 1, wherein the increment level is returned to a first level when a time, after detecting the second touch input and before detecting a further touch input, meets a threshold time.

11. The method according to claim 1, comprising:
   detecting a third touch input on the touch-sensitive display;
   further increasing the increment level of the associated one of the first indicator and the second indicator;
   moving the associated one of the first indicator and the second indicator from the third location to a fourth location, wherein the fourth location is based on the further increased increment level.

12. The method according to claim 11, wherein the second location comprises a beginning of a string, the third location comprises a beginning of a line, and the fourth location comprises a beginning of a paragraph.

13. The method according to claim 11, wherein the second location comprises an end of a string, the third location comprises an end of the line, and the fourth location comprises an end of the paragraph.

14. The method according to claim 1, wherein a direction of movement of the indicator is based on the direction of the gesture.

15. A non-transitory computer-readable medium having computer-readable code stored thereon, the computer-readable code executable by at least one processor of the electronic device to cause the electronic device to perform the method of claim 1.

16. An electronic device comprising:
   a touch-sensitive display to display information and to display a first indicator in the information and a second indicator in the information; and
   a processor coupled to the touch-sensitive display to:
      select a portion of the information between the first indicator and the second indicator;
      after selecting the portion of the information between the first indicator and the second indicator, detect, on the touch-sensitive display, a first touch input comprising a first gesture having a first origin and continuing in a first direction to a first end point, wherein the first gesture is associated with one of the first indicator and the second indicator;
      in response to detecting the first gesture:
         move the associated one of the first indicator and the second indicator from a first location to a second location in the information, wherein the second location is identified based on an increment level of the indicator; and
         increase or decrease the selected portion of the information to select the information from the first indicator to the second indicator;
      after the touch input ends, detect a second touch input comprising a second gesture having a second origin and a second direction to a second end point on the touch-sensitive display, wherein the second gesture is associated with the one of the first indicator and the second indicator;
      in response to detecting the second gesture after the first gesture and determining that the second gesture is generally in a same direction as the first gesture:
         increase the increment level of the associated one of the first indicator and the second indicator and
         move the associated one of the first indicator and the second indicator from the second location to a third location, wherein the third location is identified based on the increased increment level of the associated one of the first indicator and the second indicator.

* * * * *